United States Patent
Neuffer

(10) Patent No.: US 9,720,143 B2
(45) Date of Patent: Aug. 1, 2017

(54) OPTICAL LENS WITH SCRATCH-RESISTANT ANTI-REFLECTIVE LAYER

(71) Applicant: Carl Zeiss Vision International GmbH, Aalen (DE)

(72) Inventor: Andreas Neuffer, Asperg (DE)

(73) Assignee: CARL ZEISS VISION INTERNATIONAL GMBH, Aalen (DE)

( * ) Notice: Subject to any disclaimer, the term of this patent is extended or adjusted under 35 U.S.C. 154(b) by 0 days.

(21) Appl. No.: 14/617,257

(22) Filed: Feb. 9, 2015

(65) Prior Publication Data

US 2015/0153484 A1 Jun. 4, 2015

Related U.S. Application Data

(62) Division of application No. 13/249,455, filed on Sep. 30, 2011, now Pat. No. 8,982,466.

(Continued)

(30) Foreign Application Priority Data

Oct. 1, 2010 (DE) .......................... 10 2010 048 088

(51) Int. Cl.
*G02B 1/14* (2015.01)
*G02B 1/18* (2015.01)
(Continued)

(52) U.S. Cl.
CPC ............... *G02B 1/14* (2015.01); *G02B 1/041* (2013.01); *G02B 1/115* (2013.01); *G02B 1/18* (2015.01);
(Continued)

(58) Field of Classification Search
CPC .. G02B 1/10; G02B 1/105; G02B 1/11; G02B 1/113; G02B 1/115; G02B 1/14;
(Continued)

(56) References Cited

U.S. PATENT DOCUMENTS

| 5,909,314 A | 6/1999 | Oka et al. |
| 6,395,331 B1 * | 5/2002 | Yan .......................... C03C 17/30 |
| | | 427/169 |

(Continued)

FOREIGN PATENT DOCUMENTS

| CA | 2157070 A1 | 2/1996 |
| DE | 10227367 A1 | 1/2004 |

(Continued)

OTHER PUBLICATIONS

Schulz et al. (Antireflection coating design for plastic optics, Applied Optics vol. 41, No. 16, pp. 3107-3110) (Jun. 2002).*

(Continued)

*Primary Examiner* — Kimberly N Kakalec
(74) *Attorney, Agent, or Firm* — Harness, Dickey & Pierce, P.L.C.

(57) ABSTRACT

The present invention relates to an optical lens having a lens element produced of plastic, more particularly of plastic which is transparent in a visible spectral range, and having a coating comprising a plurality of layers, the plurality of layers comprising at least one high-refractive-index layer. Furthermore, a hardcoat layer is formed adjacent to the lens element, and a superhydrophobic layer concludes the coating in opposition to the lens element. The at least one high-refractive-index layer has a thickness of less than 40 nm, and the coating overall has a thickness of more than about 380 nm.

18 Claims, 6 Drawing Sheets

Related U.S. Application Data

(60) Provisional application No. 61/389,019, filed on Oct. 1, 2010.

(51) Int. Cl.
*G02B 1/04* (2006.01)
*G02B 1/115* (2015.01)
*G02C 7/02* (2006.01)
*G02B 27/00* (2006.01)

(52) U.S. Cl.
CPC .......... *G02B 27/0006* (2013.01); *G02C 7/02* (2013.01); *G02C 2202/16* (2013.01)

(58) Field of Classification Search
CPC . G02B 1/18; G02B 5/28; G02B 5/285; G02B 5/286
USPC ........ 359/577, 580–581, 586, 588, 601, 609
See application file for complete search history.

(56) References Cited

U.S. PATENT DOCUMENTS

| | | | |
|---|---|---|---|
| 2002/0034008 A1* | 3/2002 | Ohishi | G02B 5/0242 359/488.01 |
| 2002/0105728 A1* | 8/2002 | Yamaguchi | G02B 1/105 359/580 |
| 2005/0219724 A1* | 10/2005 | Teramoto | G02B 5/282 359/883 |
| 2006/0275627 A1 | 12/2006 | Biteau et al. | |
| 2008/0002260 A1 | 1/2008 | Arrouy et al. | |
| 2008/0003373 A1* | 1/2008 | Yan | C08F 283/10 427/444 |
| 2008/0028984 A1* | 2/2008 | Meredith | C03C 17/34 106/287.17 |
| 2008/0206470 A1 | 8/2008 | Thomas et al. | |
| 2008/0213473 A1 | 9/2008 | Roisin et al. | |
| 2008/0231957 A1* | 9/2008 | Terayama | G02B 1/115 359/586 |
| 2008/0259773 A1* | 10/2008 | Tada | G02B 1/10 369/112.23 |
| 2010/0183857 A1 | 7/2010 | Nouvelot et al. | |

FOREIGN PATENT DOCUMENTS

| | | | |
|---|---|---|---|
| DE | 102004056965 A1 | 6/2006 | |
| DE | 102007009512 A1 | 8/2008 | |
| EP | 0698798 A2 | 2/1996 | |
| FR | 2858420 A1 | 2/2005 | |
| FR | 2917510 A1 | 12/2008 | |
| FR | WO 2009004222 A1 * | 1/2009 | .......... C23C 14/022 |
| JP | 05-060904 | 3/1993 | |
| JP | 07-287102 | 10/1995 | |
| JP | 8-68902 | 3/1996 | |
| JP | 2000-180603 | 6/2000 | |
| JP | 2001-264511 | 9/2001 | |
| JP | 2001-330705 | 11/2001 | |
| JP | 2003-248102 | 9/2003 | |
| JP | 2004-109728 | 4/2004 | |
| JP | 2005-251354 | 9/2005 | |
| JP | 2007-500864 | 1/2007 | |
| JP | 2009-93068 | 4/2009 | |
| JP | 2009-093068 | 4/2009 | |
| JP | 2009-222852 | 10/2009 | |
| JP | 2009-237509 | 10/2009 | |
| JP | 2010-519586 | 6/2010 | |
| JP | 2010-184477 | 8/2010 | |
| JP | 2010-529510 | 8/2010 | |
| WO | WO-2010079495 A1 | 7/2010 | |

OTHER PUBLICATIONS

Examination Report (with English language translation) for corresponding Japanese case dated May 7, 2015; 12 pp.
Steffen Runkel et al.; Inline coating of optical substrates; 2005; pp. 246-251.
European Search Report for Application No. 11183135.0 mailed Jan. 19, 2012; 4 pp.

* cited by examiner

OPTICAL LENS WITH SCRATCH-RESISTANT ANTI-REFLECTIVE LAYER

CROSS-REFERENCE TO RELATED APPLICATIONS

This application is a divisional of U.S. application Ser. No. 13/249,455, filed Sep. 30, 2011, which claims the priority to German patent application DE 10 2010 048 088.6, filed Oct. 1, 2010, and to U.S. provisional application No. 61/389,019, filed Oct. 1, 2010. The entire contents of these priority applications are incorporated herein by reference.

BACKGROUND OF THE INVENTION

The present invention relates to an optical lens having a lens element produced of plastic, more particularly plastic which is transparent in a visible spectral range, and having a coating comprising a plurality of layers, the plurality of layers comprising at least one high-refractive-index layer.

Used increasingly often nowadays as the material for optical lenses, especially in the case of spectacle lenses, instead of a silicate glass, is a plastic which is transparent in the visible spectral range. Relative to the silicate glass, the plastic affords the advantages of a lower weight, a greater breaking strength, colourability, and the possibility of attachment of a rimless frame. A known disadvantage of plastic optical lenses, however, is the much greater susceptibility of the surface to mechanical exposures, and particularly to damage by scratching.

In order to minimize this susceptibility to mechanical exposures of optical lenses made of plastic, a coating is applied to the plastic, and is intended to protect the optical lens from mechanical events. Generally speaking, this protective function is taken on by a hardcoat. The hardcoat must likewise be transparent in the visible range and must have a refractive index close to that of the optical lens, in order to ensure high optical transparency and to prevent unwanted colour interference. Typical materials for hardcoats are siloxane or an organically modified ceramics, which organically modified ceramics have a polysiloxane matrix, wherein a metal atom, for example titanium, is built into the polysiloxane matrix instead of an oxygen atom.

Additionally known is the provision of what are called anti-reflective layers on the optical lenses, for the purpose of preventing disruptive reflections. Usually, this is achieved by a sequence of layers, wherein layers having a first refractive index and layers having a second refractive index which is higher compared to the first refractive index are applied in an alternating manner. In the aforementioned document EP 0 698 798 A2, a proposal was already made to incorporate these anti-reflective layers, which are composed, for example, of inorganic, oxidic and optically transparent materials, into the design of the coating for protection against mechanical exposure.

Document EP 0 698 798 A2 proposes a coating comprising borosilicate glass applied to the lenses by means of a PVD (Physical Vapour Deposition) method. The coating is said to have a thickness of up to 3 μm as scratch protection. Although such a layer does protect the plastic lens from mechanical effects such as scratches, it does not prevent the possibility of the layers beneath or on this layer, intended for the provision of scratch protection, in other words, in particular, the anti-reflective layers, being scratched themselves and thus leading to hazy layers which scatter light.

It is an object of the present invention, therefore, to provide an optical lens, more particularly a spectacle lens, with a coating which as well as having good antireflection properties is insusceptible to mechanical exposures.

BRIEF SUMMARY OF THE INVENTION

According to an aspect of the invention, there is provided an optical lens having a lens element produced of plastic and a coating comprising a plurality of layers, the plurality of layers comprising one high-refractive-index layer, wherein a hardcoat layer is formed adjacent to the lens element, wherein a superhydrophobic layer concludes the coating, wherein the one high-refractive-index layer has a thickness of less than 40 nm, and wherein the coating overall has a thickness of more than about 380 nm.

According to a further aspect of the invention, there is provided an optical lens having a lens element produced of plastic and a coating comprising a plurality of layers, the plurality of layers comprising at least two high-refractive-index layers, wherein a hardcoat layer is formed adjacent to the lens element, wherein a superhydrophobic layer concludes the coating, wherein the at least two high-refractive-index layers have an overall thickness of less than 40 nm, and wherein the coating overall has a thickness of more than about 380 nm.

According to a further aspect of the invention, there is provided an optical lens having a lens element produced of plastic, and having a coating comprising a plurality of layers, the plurality of layers comprising at least one high-refractive-index layer, wherein a hardcoat layer is formed adjacent to the lens element, wherein a superhydrophobic layer concludes the coating, wherein the coating overall has a thickness of more than about 380 nm, wherein in case of exactly one high-refractive-index layer, the exactly one high-refractive-index layer has a thickness of less than 40 nm, and in case of more than one high-refractive-index layer, the high-refractive-index layers together have a thickness of less than 40 nm.

In other words, an optical lens having a lens element produced of plastic, and having a coating comprising a plurality of layers is provided, the plurality of layers comprising at least one high-refractive-index layer, wherein a hardcoat layer is formed adjacent to the lens element, wherein a superhydrophobic layer concludes the coating, wherein the at least one high-refractive-index layer, in particular overall, has a thickness of less than 40 nm, and wherein the coating overall has a thickness of more than about 380 nm.

Hence, it is provided that the overall layer thickness of the high-refractive-index layer is less than 40 nm, in particular less than 36 nm. In case of exactly one high-refractive-index layer, the exactly one high-refractive-index layer has a thickness of less than 40 nm; and in case of more than one high-refractive-index layer (or at least two high-refractive-index layers), the high-refractive-index layers together (or in total or overall) have an overall thickness of less than 40 nm.

In accordance with the invention, therefore, it is proposed that the optical lens specified at the outset be developed further such that a superhydrophobic layer concludes the coating, in particular in opposition to the lens element; that the at least one high-refractive-index layer, in particular overall, has a thickness of less than 40 nm, more particularly less than 36 nm; and that the coating overall has a thickness of more than about 380 nm.

Hence, it is provided that the overall layer thickness of the high-refractive-index layer is less than 40 nm, in particular less than 36 nm. In case of exactly one high-refractive-index layer, the exactly one high-refractive-index layer has a thickness of less than 40 nm; and in case of more than one high-refractive-index layer (or at least two high-refractive-index layers), the high-refractive-index layers in total (or overall) have an overall thickness of less than 40 nm. Therefore, on the one hand, there is provided an optical lens having a lens element produced of plastic, more particularly of plastic which is transparent in a visible spectral range, and having a coating comprising a plurality of layers, the plurality of layers comprising one high-refractive-index layer, wherein a hardcoat layer is formed adjacent to the lens element, wherein a superhydrophobic layer concludes the coating, wherein the one high-refractive-index layer has a thickness of less than 40 nm, and wherein the coating overall has a thickness of more than about 380 nm. Further, on the other hand, there is provided an optical lens having a lens element produced of plastic, more particularly of plastic which is transparent in a visible spectral range, and having a coating comprising a plurality of layers, the plurality of layers comprising at least two high-refractive-index layers, wherein a hardcoat layer is formed adjacent to the lens element, wherein a superhydrophobic layer concludes the coating, wherein the at least two high-refractive-index layers have an overall thickness of less than 40 nm, and wherein the coating overall has a thickness of more than about 380 nm.

The susceptibility of optical surfaces with respect to scratching is measured in spectacle lens production using a test known as the Bayer test from Colts Laboratories, in which a defined amount of sharp-edged particles is passed over the surface of the spectacle lens and then the spectacle lens is subjected to optical evaluation. In this Bayer test of Colts Laboratories, an abrasive material is guided, by lateral movement of a small cradle, over the test lenses and reference lenses, which are uncoated CR39-standard spectacle lenses with an optical strength of 0 dioptres, these lenses being fixed at the base of the cradle. Subsequently, the test lenses are evaluated, that is, the quantity of scattered light generated as a result of the scratching is measured. The result of the test is a number which indicates how much more resistant the tested lens is relative to the uncoated CR39 reference lens. The material of CR39 is allyl diglycol carbonate (ADC) (or polyallyldiglycolcarbonate).

The invention presented here solves the problem of the mechanical durability of a plastic optical lens with a specific, optically broadband anti-reflective layer in such a way that, when the Bayer test is applied, only a minimally increased level of scattered light is produced, as expressed in Bayer values of >17.

The optical lens with the coating in question can be produced by means of a conventional PVD process. Alternatively, other known processes for obtaining such thin-layer systems are conceivable, examples being CVD (Chemical Vapour Deposition) processes, and also ion-assisted or plasma-assisted versions of the aforementioned processes.

Under "high-refractive-index", it is presently to be understood a material, in particular a layer of a material, having a refractive index of n>1.65, in particular at a wavelength of 550 nm. At lower than this refractive index, further in view of the used lens element substrates having a refractive index of 1.6 or 1.67, the layers have little effect, or none at all, as a scattering medium for light. In particular, layers of the following materials are high-refractive-index layers and may form the high-refractive-index layers: $CeO_2$, $Cr_2O_3$, $HfO_2$, ITO, Mixture $La_2O_3$—$Nb_2O_5$, Mixture $La_2O_3$—$TiO_2$, $Nb_2O_5$, Mixture $Al_2O_3$—$Pr_6O_{11}$, Mixture $Al_2O_3$—$Pr_6O_{11}$, $Sc_2O_3$, SiO, $Ta_2O_5$, $TiO_2$, Mixture $TiO_2$—$Al_2O_3$, Ti—Pr-oxide, $Y_2O_3$, ZrO, $ZrO_2$, Mixture $ZrO_2$—$TaO_2$, Mixture $ZrO_2$—$TiO_2$, ZnS, Mixture $ZrO_2$—$Y_2O_3$, $SiO_xN_y$, $SiN_x$, $Si_3N_4$, as well as layers of mixtures of these materials and/or hyper- or substoichiometric variations of these materials.

If more than one high-refractive-index layer is provided, all high-refractive-index layers may be formed of the same material. However, it can also be provided that the high-refractive-index layers are formed of different materials of the aforementioned materials.

Under "medium-refractive-index", it can presently to be understood a layer of a material having a refractive index of 1.5<n<=1.65 at a wavelength of 550 nm. In particular, layers of the following materials are medium-refractive-index layers and may form the medium-refractive-index layers: $Al_2O_3$, MgO, Mixture $Al_2O_3$—$Pr_6O_{11}$, $WO_3$ as well as layers of mixtures of these materials and/or hyper- or substoichiometric variations of these materials.

Under "low-refractive-index", it can presently to be understood a layer of a material having a refractive index of n<=1.5 at a wavelength of 550 nm. In particular, layers of the following materials are low-refractive-index layers and may form the low-refractive-index layers: $SiO_2$, Mixture $SiO_2$—$Al_2O_3$, $BaF_2$, $CaF_2$, $Na_3AlF_6$, $MgF_2$, $YbF_3$, Mixture $YbF_3$—$CaF_2$, $YF_3$, Mixture $YF_3$—$BaF_2$ as well as layers of mixtures of these materials and/or hyper- or substoichiometric variations of these materials.

In order to exhibit high scratch resistance, i.e. a Bayer value>17, in conjunction with good antireflection properties, i.e. substantially a reflectance of less than 2.5% in a visible wavelength range, in particular in a range of 450 nm to 650 nm, therefore, the optical lens must first be coated with a suitable hardcoat. This hardcoat then may have applied to it a multilayer construction of anti-reflective layers, with a thickness overall of more than about 380 nm, more particularly more than about 400 nm. Within these anti-reflective layers, the high-refractive-index layers must in total remain as thin as possible. In particular, the at least one high-refractive-index layer is intended to have a thickness of in total not more than 40 nm, more particularly not more than 35 nm.

In opposition to the lens element composed of plastic, the coating ought then to conclude with a superhydrophobic layer.

In a refinement, the superhydrophobic layer is formed of a material on which water adopts a contact angle of more than 90°, and more particularly the superhydrophobic layer is formed of a material on which water adopts a contact angle of more than 95°, more particular 100°.

With a superhydrophobic layer of this kind, the sliding friction between the layer surface and particles present on the layer surface is minimized, this having the effect, on the one hand, of improved beading of water from the optical lens, and minimizing, on the other hand, any sliding friction between the layer surface and the particles that are used during the Bayer test, resulting in a better test result.

In a refinement, it is possible for the coating to have precisely one high-refractive-index layer. In this case, more particularly, it is possible for the precisely one high-refractive-index layer to have a thickness of less than 20 nm, in particular less than 15 nm. This results in significantly better properties with regard to mechanical exposure.

In a further refinement, it is possible for the coating to have two high-refractive-index layers. More particularly, one of the two high-refractive-index layers may have a thickness of about 10 nm. Furthermore, the two highrefractive-index layers overall or together have a thickness of not more than 40 nm, in particular not more than 35 nm.

In a refinement, it is possible for the at least one high-refractive-index layer to be formed of $ZrO_2$, $TiO_2$ or $Ta_2O_5$.

Furthermore, in a refinement, the coating comprises at least one low-refractive-index layer and/or at least one medium-refractive-index layer. The at least one low-refractive-index layer may be formed, in particular, of $SiO_2$ or $MgF_2$. In this way, a particularly good antireflection effect is achieved, in conjunction with a mechanically stable structure.

In a further refinement of the invention, the at least one high-refractive-index layer is disposed or embedded between two low-refractive-index layers or two medium-refractive-index-layers or one low-refractive-index layer and one medium-refractive-index-layer.

In a refinement of the invention, a hardness of the plurality of layers increases from the hardcoat layer in the direction of the superhydrophobic layer. In other words, a gradient in the hardness of the coating ought to rise from the hardcoat layer in the direction of the superhydrophobic layer. It has been found that in this case, a significantly better Bayer value can be achieved.

In an embodiment of the invention, it is provided that at least two low-refractive-index-layers and at least two medium-refractive-index layers are positioned in an alternating arrangement between the lowermost high-refractive-index layer and the hardcoat layer. In particular, therein, it can be provided that three medium-refractive-index layers and two low-refractive-index layers are positioned between the lowermost of the at least one high-refractive-index layer and the hardcoat layer. Alternatively, it can be provided that two medium-refractive-index layers and three low-refractive-index layers are positioned between the lowermost of the at least one high-refractive-index layer and the hardcoat layer.

Further, in an embodiment, it can be provided that the layers from the superhydrophobic layer to and including the lowermost high-refractive-index layer include at least one low-refractive-index layer, at least one medium-refractive-index layer and at least one high-refractive-index layer.

In a refinement of the invention, disposed in alternation between the superhydrophobic layer and the hardcoat layer, there are at least two layers formed of $SiO_2$ and at least three layers formed of $Al_2O_3$, and one of the three layers formed of $Al_2O_3$ is adjacent to the hardcoat layer. With this construction, and with observance of the thicknesses specified in accordance with the invention for the different layers and for the coating, it is possible, with good antireflection properties, i.e. a reflectance of substantially below 2.5% in a visible spectral range, to achieve a good test result in the Bayer test.

In a further refinement of the invention, it can be provided that the at least one high-refractive-index layer has a refractive index of n>1.65. Further, it can be provided that the at least one medium-refractive-index layer has a refractive index of 1.5<n<=1.65 and that the at least one low-refractive-index layer has a refractive index of n<=1.5.

In a further refinement of the invention, it can be provided that the coating excluding the hardcoat layer overall has a thickness of more than about 380 nm. In this case, the condition for the minimum thickness of the coating applies under exclusion of the hardcoat layer. Then, already the superhydrophobic layer and the anti-reflective layers, i.e. the low-refractive-index layers, the medium-refractive-index layers and the high-refractive-index layers, overall must have a thickness of more than 380 nm.

It will be appreciated that the features specified above and those still to be elucidated below can be used not only in the particular combination indicated but also in other combinations or else alone, without departing from the scope of the present invention.

BRIEF DESCRIPTION OF THE DRAWINGS

Embodiments of the invention are shown in the drawings and explained in greater detail in the description below. In the drawings.

DETAILED DESCRIPTION OF THE PREFERRED EMBODIMENTS

Figure 1:
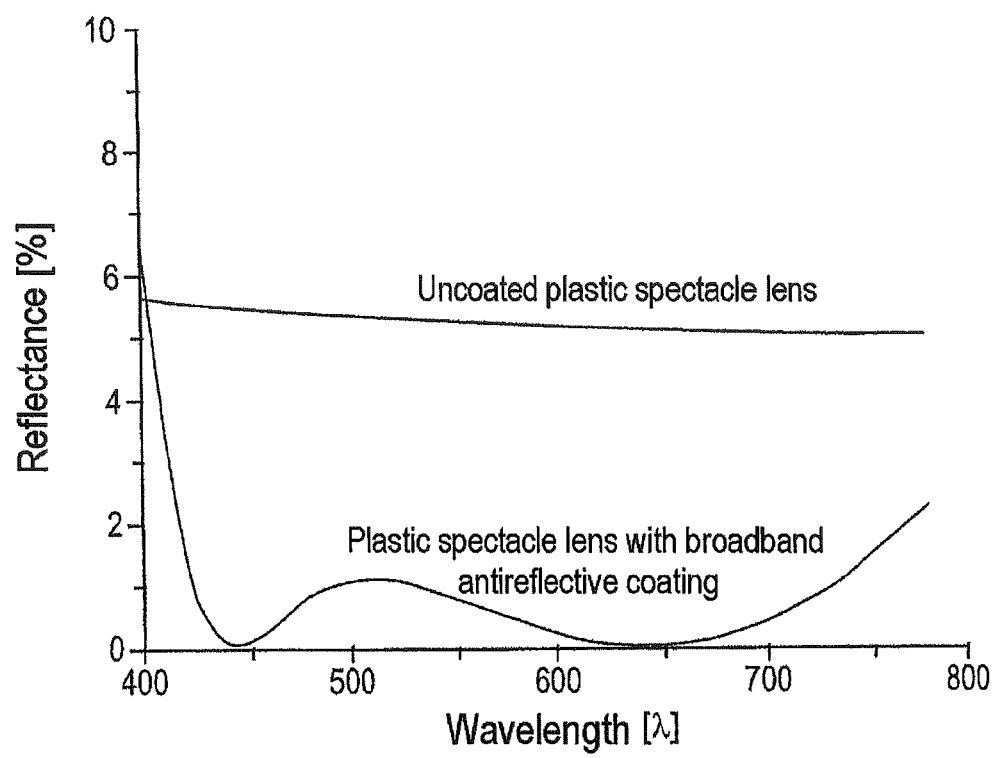
FIG. 1 shows a reflection curve for a prior-art spectacle lens made of plastic, with a refractive index n=1.6, without and with a broadband anti-reflective layer.

FIG. 1 shows a reflection curve of a prior-art plastic spectacle lens with broadband anti-reflective coating, having a refractive index n=1.6, in comparison to an uncoated plastic spectacle lens.

A coating on a known optical lens of this kind typically has a multiplicity of successive layers having each a lower and a higher refractive index and each with a precisely defined thickness. In the case of high-refractive-index spectacle lenses in particular, such broadband anti-reflective coating is important for reducing disruptive reflections and, moreover, for allowing very good transmission. Normally in such cases a plurality of layers having a relatively high refractive index are provided, and together with the layers having a relatively low refractive index produce the desired antireflection effect. The overall layer thickness of the layers with the higher refractive index in such arrangements is about 50 to 150 nm. It is the objective of the invention, accordingly, to provide an optical lens having similarly good reflectance values which additionally has a Bayer value as high as possible.

Figure 2:
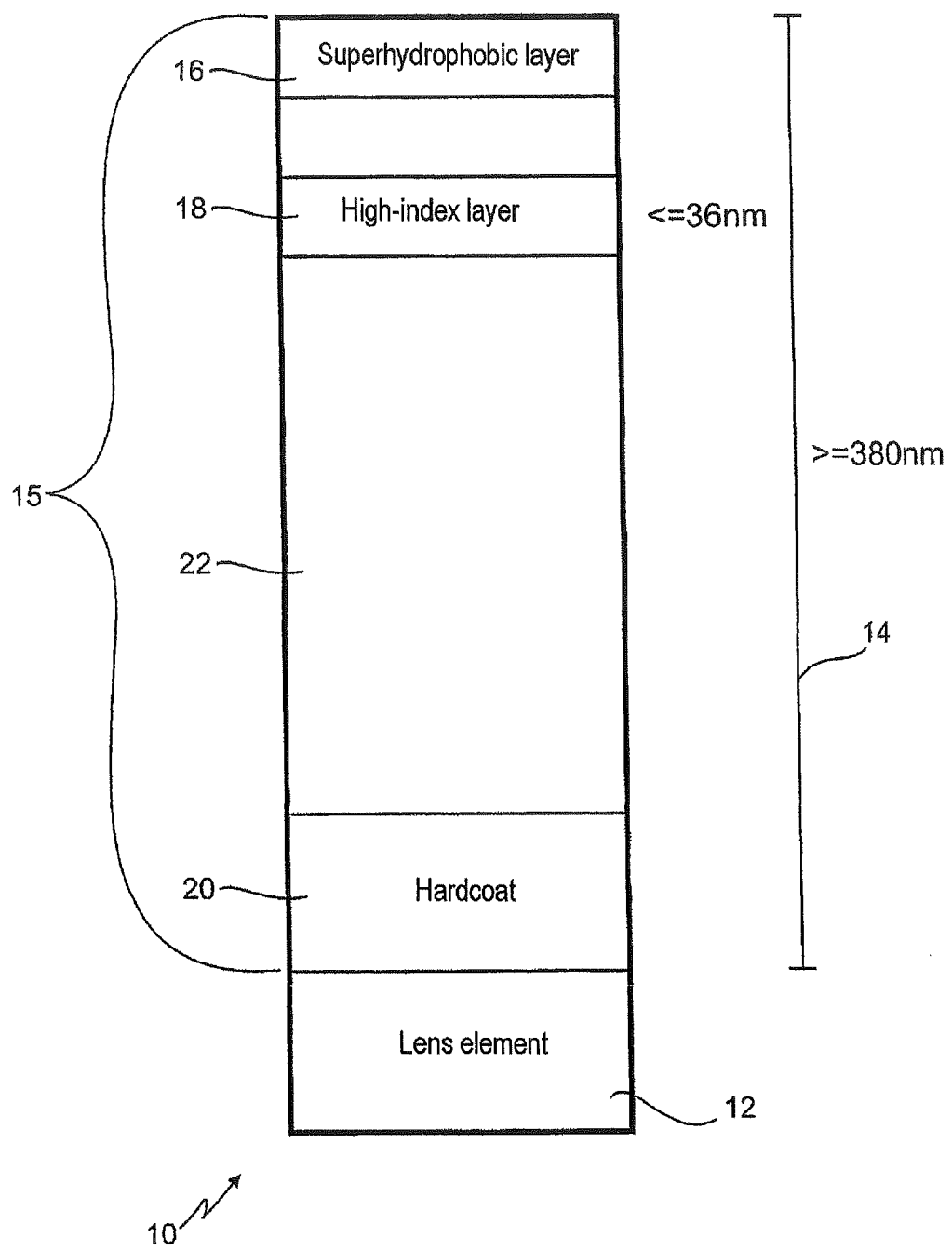
FIG. 2 shows a schematic view of an optical lens according to the invention.

FIG. 2 shows, correspondingly, an optical lens 10 designed in accordance with the teaching of the present invention. The optical lens 10 has a lens element 12 which is transparent in a visible spectral range and is produced from a plastic. This lens element 12 is provided with a coating 14, the coating 14 having a plurality of layers 15. The coating 14 is on the lens element 12. In opposition to the lens element 12, the coating 14 concludes with a superhydrophobic layer 16. Accordingly, the superhydrophobic layer 16, if the lens element 12 is said to lie at the "bottom", forms the topmost layer of the coating 14. This superhydrophobic layer is formed of a material on which water adopts a contact angle of more than 90°, in particular more than 100°.

The plurality of layers 15, moreover, comprise at least one high-refractive-index layer 18. By a high-refractive-index layer is meant in the present context that the material has a refractive index n>1.65, or by a high-refractive-index layer is meant in the present context that the material has a refractive index n>1.8 for light having a wavelength of 589 nm.

Formed adjacent to the lens element 12 is a hardcoat layer 20. Typical materials for this hardcoat layer 20 are known to the skilled person and are already in use in the prior art.

Lastly, the plurality of layers 15 further comprise additional antireflective layers 22, which may comprise both low-refractive-index layers, medium-refractive-index layers and further high-refractive-index layers. In the embodiment shown, however, no further importance attaches to the precise construction of these further anti-reflective layers 22, and the construction can also be selected arbitrarily.

One of the functions of the hardcoat layer 20 within the coating 14 is that the hardcoat layer 20 serves for stress compensation between the inorganic anti-reflective layers 18, 22. The anti-reflective layers 18, 22 have a relatively low coefficient of thermal expansion, whereas the lens element 12, which is produced of an organic plastic, enjoys a high coefficient of thermal expansion. Furthermore, the side of the hardcoat layer 20 that faces away from the lens element 12 forms a surface with good adhesive strength for the anti-reflective layers 22.

In order to maximize the Bayer value, it has emerged that the plurality of layers 15 should be applied with a hardness gradient that increases from the lens element 12 to the superhydrophobic layer 16. In experiments it has emerged that the Bayer value obtained is lower in principle if layers situated further towards the bottom, i.e. closer in the direction towards the lens element 12, are harder than the layers situated further to the top, i.e. closer in the direction towards the superhydrophobic layer 16. This emerges in particular if the layers situated closer to the superhydrophobic layer 16 comprise at least one high-refractive-index layer 18, as is the case with the coating 14. Correspondingly, provision ought to be made for a hardness of the plurality of layers 15 to increase from the hardcoat layer 20 in the direction of the superhydrophobic layer 16.

Correspondingly, the hardcoat layer 20 occupies a middle position in terms of hardness between the relatively soft plastics surface and the hard anti-reflective layer. Moreover, the hardcoat layer 20 supports the anti-reflective layers 18, 22.

An overall thickness of the coating 14 ought to be greater than about 380 nm, in particular greater than about 400 nm. In particular, the coating 14 excluding the hardcoat layer 20, i.e. only the layers 16, 18, 22, already has a thickness of more than about 380 nm, in particular more than about 400 nm. This prevents the coating rupturing under mechanical load, as for instance in the event of mechanical load caused by abrasive test elements in the course of the Bayer test, and so losing its protective function and/or its antireflection function. However, the overall thickness of the at least one high-refractive-index layer 18 must be as thin as possible. The presence of at least one high-refractive-index layer 18 is necessary for a satisfactory antireflection effect. In order to obtain a Bayer value of >17, however, the overall thickness of the at least one high-refractive-index layer ought not to be greater than 40 nm, in particular not greater than 35 nm. It has been found that damage to the at least one high-refractive-index layer 18 together with its surrounding remaining anti-reflective layers 22, as a result, for example, of the abrasive particles in the Bayer test, produces areas having an increased scattering effect for light, in line with the quality and quantity of the damage. Depending on the damage and on the thickness of the at least one high-refractive-index layer 18, this scattering effect results in surfaces of greater or lesser haze, thereby reducing the maximum Bayer value attainable by the coating 14 as a whole. As a result of the mandated limitation on the maximum thickness of the at least one high-refractive-index layer 18, this effect can be minimized and an optimum Bayer value achieved with the given coating 14.

Figure 3:
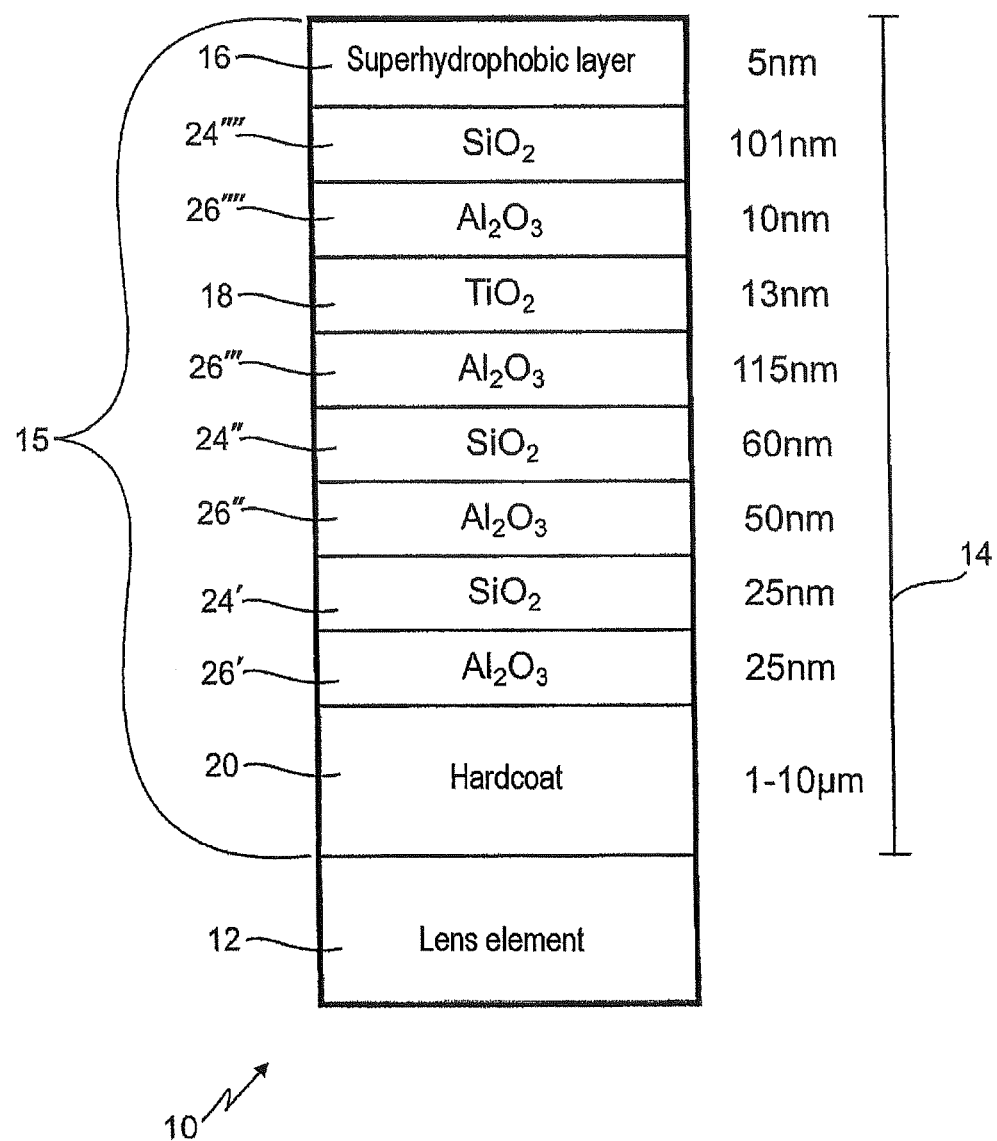
FIG. 3 shows a schematic view of another embodiment of an optical lens according to the invention.

FIG. 3 shows a first embodiment of an optical lens 10 according to the invention.

In this embodiment, precisely one high-refractive-index layer 18 is formed in the coating 14, having been produced by vapour deposition of titanium oxide ($TiO_2$). Provided within the coating 14, furthermore, are further low-refractive-index layers 24 which are made of quartz ($SiO_2$), and medium-refractive-index layers 26 which are made of aluminium oxide ($Al_2O_3$).

Formed on the lens element 12, first of all, is the hardcoat layer 20, with a thickness of 1 to 10 μm. Disposed on the hardcoat layer is, first of all, a layer 26' of aluminium oxide, with a thickness of 25 nm. Arranged on this layer, in turn, is a layer 24' of quartz, with a thickness likewise of 25 nm. Arranged on this layer is a second layer 26'' of aluminium oxide, with a thickness of 50 nm, on which, in turn, a second layer 24'' of quartz is arranged, with a thickness of 60 nm. This layer is then followed by a third layer 26''' of aluminium oxide, with a thickness of 115 nm. Provided on this third layer 26''' of aluminium oxide is the high-refractive-index layer 18 of titanium oxide, which has a thickness of 13 nm. The overall coating 14 has precisely one high-refractive-index layer 18. Applied to this layer in turn is a further layer 26'''' of aluminium oxide in a thickness of 10 nm. This is followed by a further, fourth layer 24'''' of quartz, with a thickness of 101 nm, on which there is arranged, finally, the superhydrophobic layer 16, with a thickness of 5 nm, which concludes the coating 14 at the top.

Through the alternating arrangement of layers 24 of quartz and layers 26 of aluminium oxide, it is possible to achieve an intrinsic overall stress which does not lead to the delamination of the layers 15. This is achieved in the present instance by alternation of the layers 26 of aluminium oxide, in which a tensile stress prevails, with the layers 24 of quartz, in which a compressive stress prevails. The multiple-ply construction of a plurality of layers 24 and 26, therefore, is mechanically beneficial in terms of the resulting overall stress, and also contributes to the antireflection effect of the coating 14. In principle, the multiple-ply construction of the layers 24 and 26 may comprise an arbitrarily large number of layers and different thickness combinations, and it is not confined to the examples shown. They are merely preferred examples which provide one particularly favourable combination of antireflection effect and Bayer value.

Figure 4:
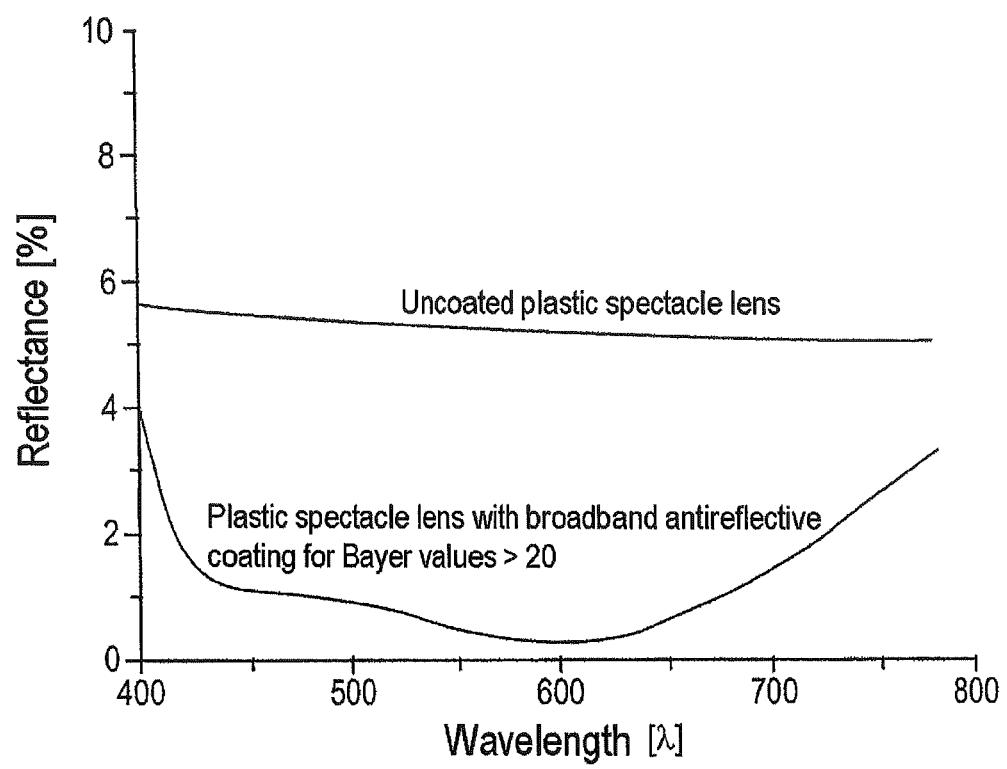
FIG. 4 shows a reflectance curve of the optical lens in FIG. 3.

FIG. 4 shows a reflectance curve of the optical lens 10 shown diagrammatically in FIG. 3. By means of the coating shown in FIG. 3, the optical lens 10 of the invention according to the first embodiment is able to attain a Bayer value of more than 20. As is evident from the reflectance curve, moreover, the optical lens 10 has very good antireflection properties. In the visible spectral range, the transmittance is more than 98%. Accordingly, the optical lens 10 according to the first embodiment meets not only the antireflection effect requirements but also the high Bayer value requirements.

Figure 5:
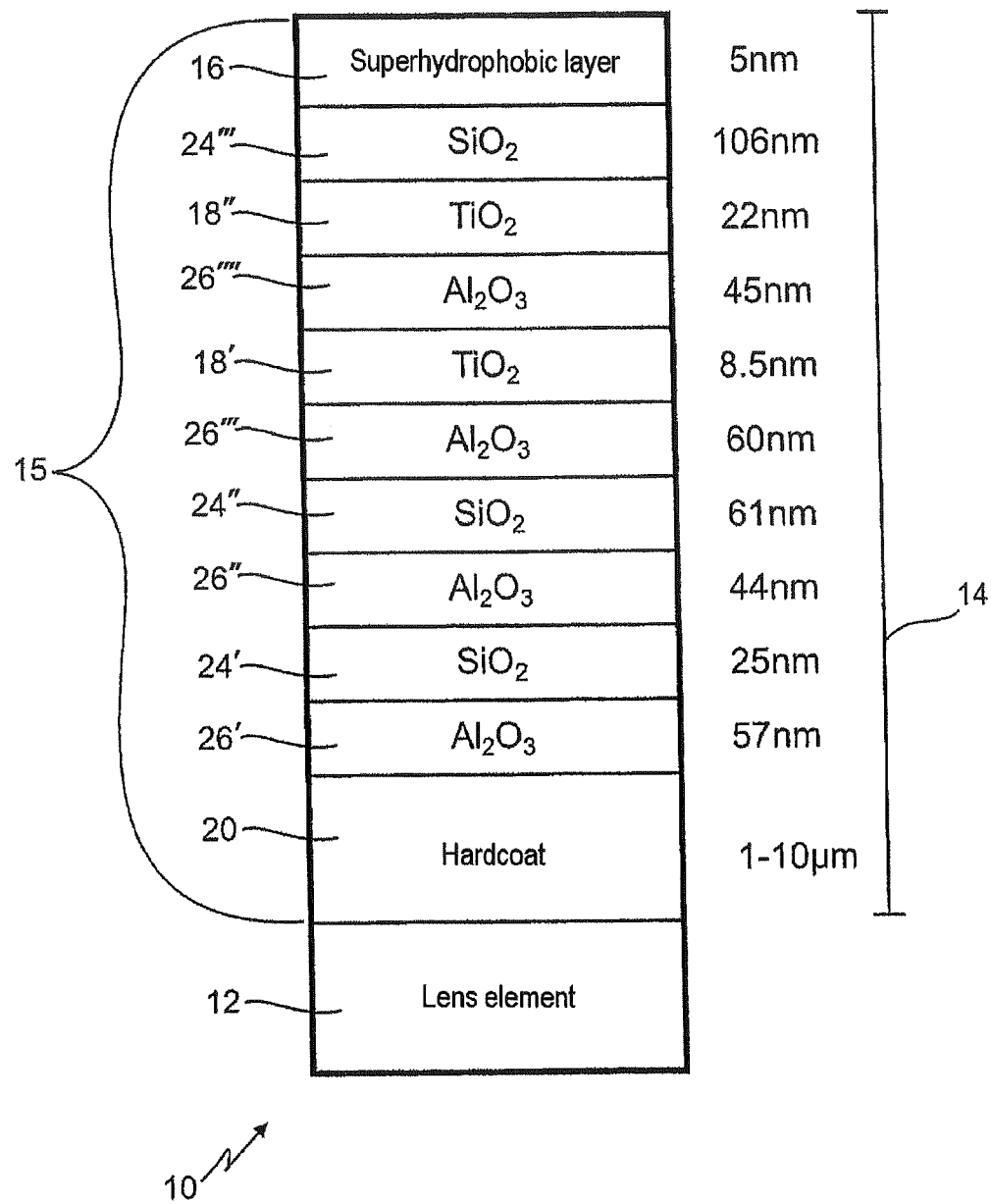
FIG. 5 shows a schematic view of a further embodiment of an optical lens according to the invention.

FIG. 5 shows the optical lens 10 in a second embodiment of the present invention. The embodiment shown in FIG. 5 differs from the embodiment shown in FIG. 3 in particular in that the second embodiment, shown in FIG. 5, has two high-refractive-index layers 18, 18'. One of these two high-refractive-index layers 18' has a thickness of about 10 nm, more particularly precisely 8.5 nm in the present example shown. The thickness of the other high-refractive-index layer 18 is to be made such, accordingly, that the high-refractive-index layers 18, 18' overall have a thickness of less than 40 nm, in particular less than 36 nm. In the embodiment shown in FIG. 5, therefore, the high-refractive-index layer 18 is formed with a thickness of 22 nm.

In the shown second embodiment of the optical lens 10, a hardcoat layer 20 is applied first of all to the lens element 12, with a thickness of 1 to 10 μm. Located on this layer 20 is a layer 26' of aluminium oxide, with a thickness of 57 nm. Applied to that layer in turn is a layer 24' of quartz, with a thickness of 25 nm. Located thereon is a second layer 26'' of aluminium oxide, with a thickness of 44 nm, to which in turn a second layer 24'' of quartz is applied, with a thickness of 61 nm. Located on this layer is a third layer 26''' of aluminium oxide, with a thickness of 60 nm. Applied to that layer, then, is the first high-refractive-index layer 18' of titanium oxide, with a thickness of 8.5 nm. Located on this layer, in turn, is a layer 26'''' of aluminium oxide, with a thickness of 45 nm, to which then, in turn, the second high-refractive-index layer 18'' of titanium oxide is applied, with a thickness of 22 nm. Applied to that layer is a third layer 24''' of quartz, with a thickness of 106 nm, and the superhydrophobic layer 16, with a thickness of 5 nm, concludes the coating 14 at the top, in opposition to the lens element 12. With a construction of this kind for the coating 14, as well, good Bayer values can be achieved. The coating 14 shown in FIG. 5 allows Bayer values of more than 17 to be attained.

Figure 6:
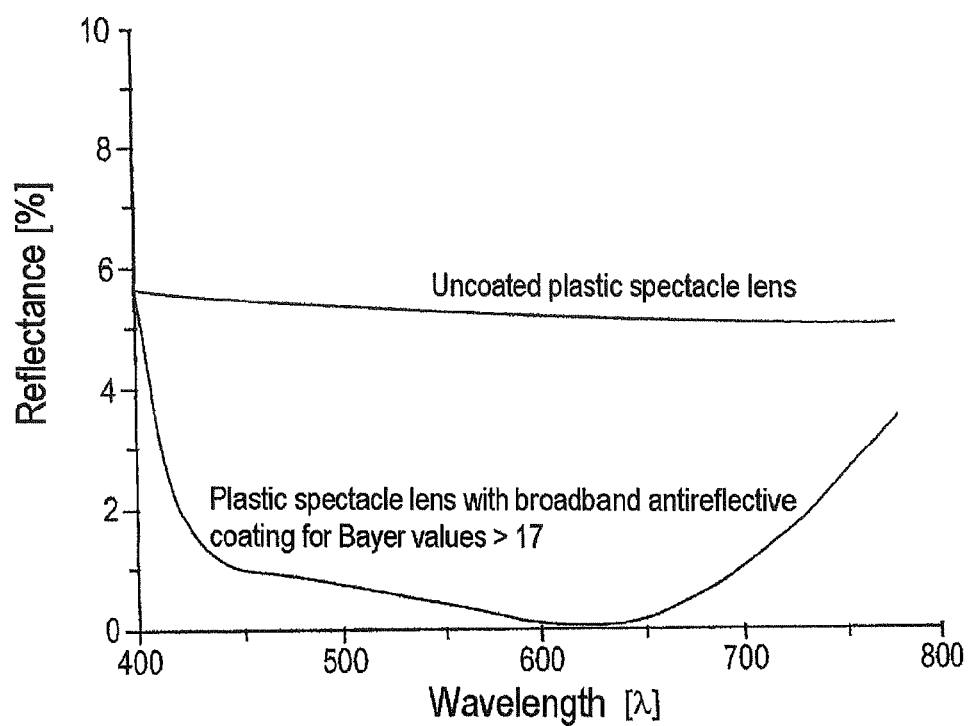
FIG. 6 shows a reflectance curve of the optical lens in FIG. 5.

FIG. 6 depicts a reflectance curve of the optical lens 10 shown in FIG. 5. Here as well, in a visible spectral range, the optical lens has a good antireflection property; the transmittance is more than 98%.

Lastly, looking at FIG. 3 and FIG. 5, it can be seen that an overall thickness of the coating 14, in particular also excluding the hardcoat layer 20, in both cases is greater than 400 nm. Provision is made, furthermore, for a high-refractive-index layer 18, 18', 18'' to be embedded always between two low-refractive-index layers 24 or between two medium-refractive-index layers 26 or between one low-refractive-index layer 24 and one medium-refractive-index layer 26. In the examples of FIGS. 3 and 5, the high-refractive-index layers are produced from titanium oxide. In principle, however, they may also be produced from zirconium oxide ($ZrO_2$) or tantalum oxide ($Ta_2O_5$) or any other of the initially mentioned materials. The low-refractive-index layers in the embodiments shown are prepared from quartz ($SiO_2$) and the medium-refractive-index layers of aluminium oxide ($Al_2O_3$). More particularly, these two materials are used in alternation in order to compensate the mechanical stresses within the coating 14. Alternatively, however, for example magnesium fluoride ($MgF_2$) can also be provided as a material.

What is claimed is:

1. An optical lens having a lens element produced of plastic and a scratch resistant anti-reflective coating comprising a plurality of layers, the plurality of layers comprising precisely two high-refractive-index layers, wherein a hardcoat layer is formed adjacent to the lens element, wherein a superhydrophobic layer concludes the scratch resistant anti-reflective coating, wherein the two high-refractive-index layers have an overall thickness of less than 40 nm, and wherein the scratch resistant anti-reflective coating excluding the hardcoat layer has an overall thickness of more than about 380 nm, wherein the optical lens has a Bayer value of greater than 17.

2. The optical lens according to claim 1, wherein the superhydrophobic layer is formed of a material on which water adopts a contact angle of more than 90°.

3. The optical lens according to claim 1, wherein at least one of the two high-refractive-index layers has a thickness of less than 15 nm.

4. The optical lens according to claim 1, wherein one of the two high-refractive-index layers has a thickness of less than or equal to about 10 nm.

5. The optical lens according to claim 1, wherein the two high-refractive-index layers are formed of $ZrO_2$, $TiO_2$ or $Ta_2O_5$.

6. The optical lens according to claim 1, wherein the scratch resistant anti-reflective coating has at least one low-refractive-index layer and/or at least one medium-refractive-index layer.

7. The optical lens according to claim 6, wherein the at least one low-refractive-index layer is formed of $SiO_2$, $Al_2O_3$ or $MgF_2$.

8. The optical lens according to claim 6, wherein each of the two high-refractive-index layers is embedded between two low-refractive-index layers or two medium-refractive-index-layers or one low-refractive-index layer and one medium-refractive-index-layer.

9. The optical lens according to claim 6, wherein the at least one medium-refractive-index layer has a refractive index of $1.5<n<=1.65$ and that the at least one low-refractive-index layer has a refractive index of $n<=1.5$.

10. The optical lens according to claim 1, wherein a hardness of the plurality of layers increases from the hardcoat layer in the direction of the superhydrophobic layer.

11. The optical lens according to claim 1, wherein at least two low-refractive-index-layers and at least two medium-refractive-index layers are positioned in an alternating arrangement between the lowermost high-refractive-index layer and the hardcoat layer.

12. The optical lens according to claim 1, wherein the two high-refractive-index layers have a refractive index of $n>1.65$.

13. The optical lens according to claim 1, wherein the optical lens has a reflectance of less than about 2.5% for visible light having a wavelength ranging from 450 nm to 650 nm.

14. The optical lens according to claim 1, wherein the optical lens has a Bayer value of greater than 20.

15. An optical lens having a lens element produced of plastic and a scratch resistant anti-reflective coating comprising a plurality of layers, the plurality of layers comprising at least two high-refractive-index layers, wherein a hardcoat layer is formed adjacent to the lens element, wherein a superhydrophobic layer concludes the scratch resistant anti-reflective coating, wherein the at least two high-refractive-index layers have an overall thickness of less than 40 nm, and wherein the scratch resistant anti-reflective coating excluding the hardcoat layer has an overall thickness of more than about 380 nm, wherein the optical lens has a Bayer value of greater than 17, wherein the at least two high-refractive index layers are formed of $ZrO_2$ or $TiO_2$, and wherein the scratch resistant anti-reflective coating has at least one low-refractive-index layer, wherein the at least one low-refractive-index layer comprises one or more materials selected from $YbF_3$, $YF_3$, a mixture of $YbF_3$—$CaF_2$, or a mixture $YF_3$—$BaF_2$.

16. An optical lens having a lens element produced of plastic and a scratch resistant anti-reflective coating comprising a plurality of layers, the plurality of layers comprising at least two high-refractive-index layers, at least one medium-refractive index layer, and at least one low-refractive-index layer, wherein a hardcoat layer is formed adjacent to the lens element, wherein a superhydrophobic layer concludes the scratch resistant anti-reflective coating, wherein the at least two high-refractive-index layers have an overall thickness of less than 40 nm, the at least two high-refractive index layers are formed of $ZrO_2$ or $TiO_2$ and the at least one low-refractive-index layer comprises one or more materials selected from $YbF_3$, $YF_3$, a mixture of $YbF_3$—$CaF_2$, or a mixture $YF_3$—$BaF_2$ wherein the scratch resistant anti-reflective coating excluding the hardcoat layer has an overall thickness of more than about 380 nm, and wherein the optical lens has a Bayer value of greater than 17.

17. An optical lens having a lens element produced of plastic and a scratch resistant anti-reflective coating comprising a plurality of layers, the plurality of layers comprising at least two high-refractive-index layers, wherein a hardcoat layer is formed adjacent to the lens element, wherein a superhydrophobic layer concludes the scratch resistant anti-reflective coating, wherein the at least two high-refractive-index layers have an overall thickness of less than 40 nm, and wherein the scratch resistant anti-reflective coating excluding the hardcoat layer has an overall thickness of more than about 380 nm, wherein the optical lens has a Bayer value of greater than 17, wherein at least two low-refractive-index-layers and at least two medium-refractive-index layers are positioned in an alternating arrangement between the lowermost high-refractive-index layer and the hardcoat layer.

18. The optical lens according to claim 17, wherein the at least one medium-refractive-index layer has a refractive index of $1.5<n<=1.65$ and that the at least one low-refractive-index layer has a refractive index of $n<=1.5$.

* * * * *